(12) United States Patent
Baker et al.

(10) Patent No.: US 7,039,105 B2
(45) Date of Patent: May 2, 2006

(54) ADAPTIVE INFORMATION COMPRESSION

(75) Inventors: Arleigh B. Baker, Longwood, FL (US); James H. Hughen, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 909 days.

(21) Appl. No.: 09/835,401

(22) Filed: Apr. 17, 2001

(65) Prior Publication Data

US 2002/0159516 A1  Oct. 31, 2002

(51) Int. Cl.
*H04B 1/66* (2006.01)

(52) U.S. Cl. .................. 375/240; 375/316; 375/340; 370/210; 370/310; 704/500

(58) Field of Classification Search ............... 375/240, 375/326, 316, 134, 340, 260, 240.01, 240.26, 375/244; 370/315, 484, 307, 210, 208, 310; 704/223, 500
See application file for complete search history.

(56) References Cited

U.S. PATENT DOCUMENTS

| | | | | | |
|---|---|---|---|---|---|
| 4,316,282 | A | * | 2/1982 | Macina | 370/484 |
| 5,590,156 | A | * | 12/1996 | Carney | 375/316 |
| 5,638,406 | A | * | 6/1997 | Sogabe | 375/326 |
| 6,401,062 | B1 | * | 6/2002 | Murashima | 704/223 |
| 6,690,657 | B1 | * | 2/2004 | Lau et al. | 370/315 |

* cited by examiner

*Primary Examiner*—Stephen Chin
*Assistant Examiner*—Ted M. Wang
(74) *Attorney, Agent, or Firm*—Buchanan Ingersoll PC

(57) ABSTRACT

An adaptive information compression system and method conserves information bandwidth or storage space by compressing underutilized information present in a wide-band signal into a much narrower maximum utilized information band signal. This is achieved by obtaining a spectral concentration map of an input wide-band signal by transforming the wide-band signal into the frequency domain and de-selecting the data space where there is substantially little spectral activity. A narrow-band signal is created by reformatting the remaining data space into a contiguous narrow-band signal. The original time-domain image of the data, which has the inactive spectra removed, is reconstructed from the narrow-band signal, thus allowing the total time-domain bandwidth to be significantly less than the original.

6 Claims, 4 Drawing Sheets

ADAPTIVE INFORMATION COMPRESSION

BACKGROUND OF THE INVENTION

1. Field of the Invention

The present invention relates to adaptive information compression. More specifically, the present invention relates to the compression of bandwidth in order to recreate active portions of the bandwidth at a remote location.

2. Background Information

Commercial services such as radiotelephone and television require the use of expensive transmitters or base stations to provide coverage for their target areas. Remote locations, such a rural areas, sometimes have difficultly receiving such signals due to their distance from the nearest transmitter or due to elements of their terrain (such as a mountain range).

In addition, with respect to radiotelephone coverage, certain public events, such as stadium events, can cause a temporary sharp increase in demand for available channels.

The cost of building additional transmitters and base stations in order to provide service to remote areas, poor signal areas, or temporary increased demand areas is not always cost effective. Therefore, there is a need for a low cost system and method that can provide signal coverage for these aforementioned areas.

One solution is to sample the entire relevant frequency band from a given signal area and using a fiber-optic cable, transport the entire spectrum to a target location where the entire spectrum is retransmitted. This solution is expensive, requires a large storage capability, and uses excessive processing time, since for example, the necessary bandwidth could be on the order of 25 MHz or more, thus requiring large storage space. In addition, because the above solution uses fiber-optic cable, the above system and method would not be feasible for temporary use.

Therefore, there is a need for a low cost system and method that can provide signal coverage for remote areas, poor signal areas, and temporary areas, without the need to process and transport a signal having a large bandwidth.

SUMMARY OF THE INVENTION

The present invention is directed to conserving information bandwidth or storage space by compressing underutilized information present in a wide-band signal into a much narrower maximum utilized information band signal. This is achieved by obtaining a spectral concentration map of an input wide-band signal by transforming the wide-band signal into the frequency domain and de-selecting the data space where there is substantially little spectral activity. A narrow-band signal is created by reformatting the remaining data space into a contiguous narrow-band signal. Finally, the original time-domain image of the data, which has the inactive spectra removed, is reconstructed from the narrow-band signal, thus allowing the total time-domain bandwidth to be significantly less than the original.

BRIEF DESCRIPTION OF THE DRAWINGS

Other objects and advantages of the present invention will become apparent to those skilled in the art from the following detailed description of exemplary embodiments, when read in conjunction with the accompanying drawings wherein like elements have been designated with like reference numerals and wherein.

DETAILED DESCRIPTION OF THE PREFERRED EMBODIMENTS

Figure 1:
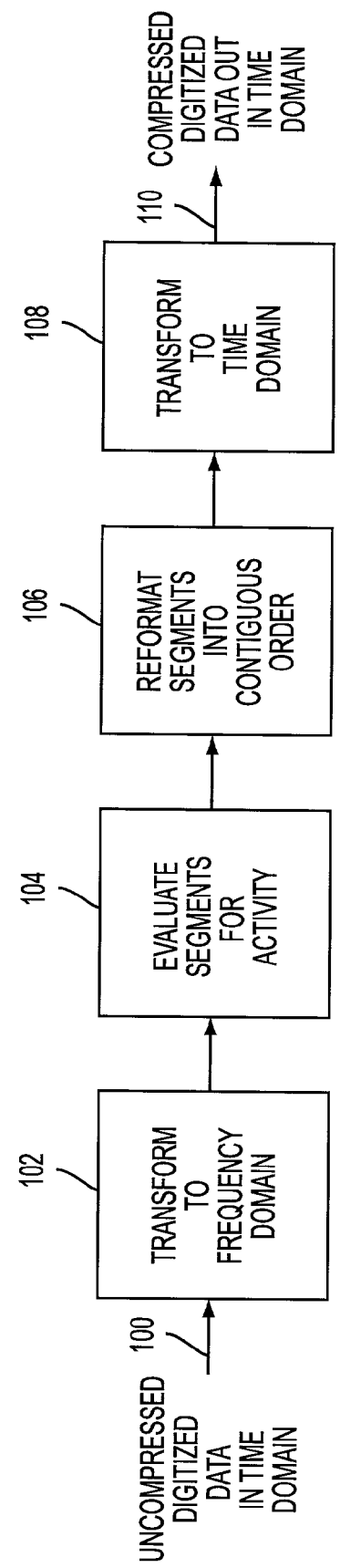
FIG. 1 illustrates an exemplary block diagram of an embodiment of the present invention.

FIG. 1 illustrates a block diagram of an exemplary embodiment of the present invention. In block 102, uncompressed digitized data representing a wide-band signal in the time domain 100 is transformed to the frequency domain. In block 104, the frequency domain signal is broken down into segments which represent the width of a channel, e.g., a 30 kHz segment for a cellular radio telephone. Each segment is evaluated to determine if the segment contains active spectrum. Active spectrum is defined as spectrum which contains an energy or power level higher than a predetermined threshold. One skilled in the art will readily appreciate that the appropriate predetermined threshold will vary based on the actual use of the present invention for a given environment. That is, the sensitivity of the evaluation will relate to the expected energy levels or signal strengths common to the type of signal or spectrum which is being compressed by the present invention, e.g., cellular telephone, trunked radio, television, radio, etc.

The active segments are then reformatted into a contiguous order in a narrow-band signal (i.e., a smaller band than the uncompressed digitized data 100) in block 106. The frequency domain narrow-band signal is then transformed to the time domain in block 108 which provides a compressed digitized narrow-band signal in the time domain 110.

Figure 2:
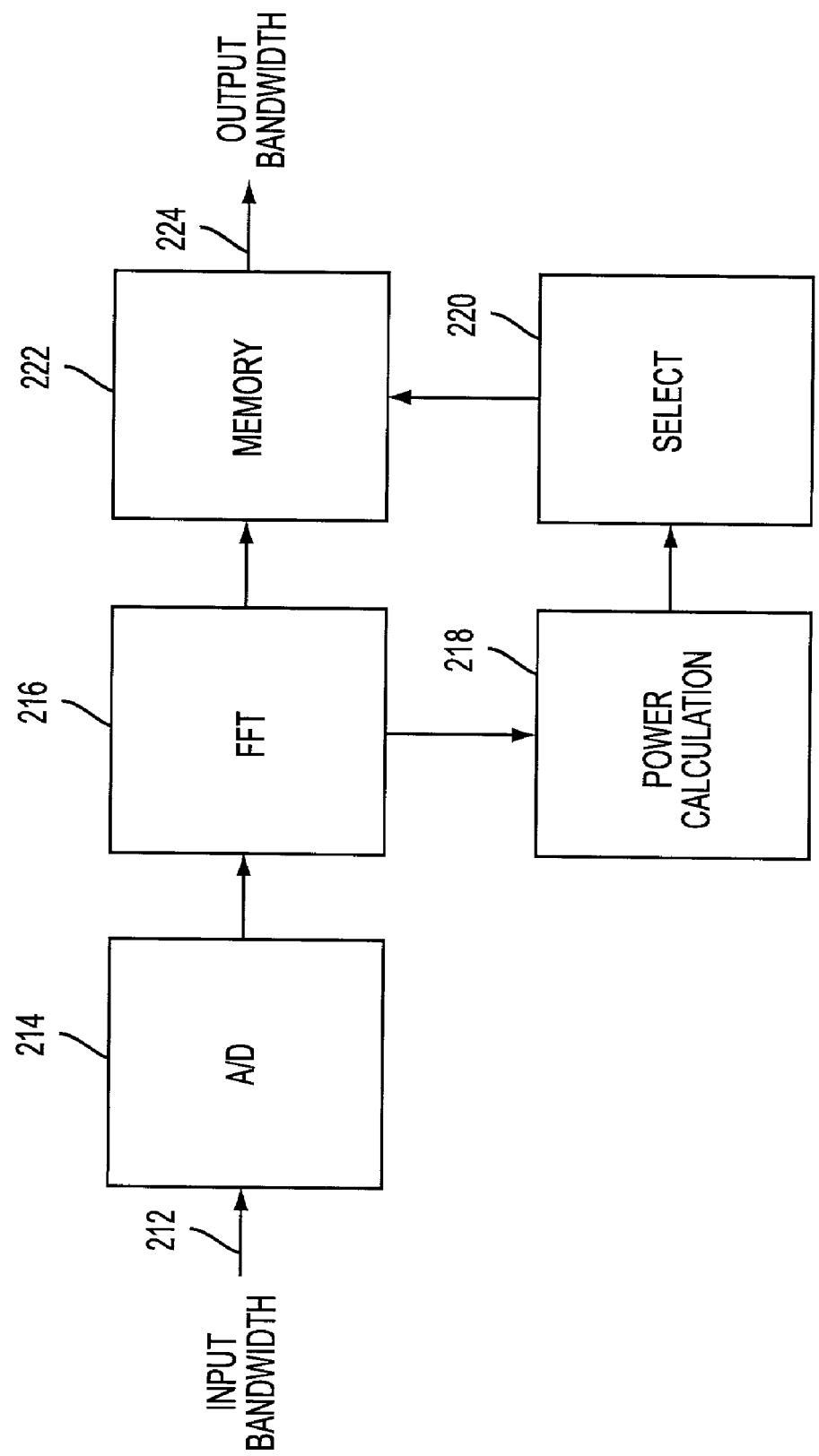
FIG. 2 illustrates an exemplary embodiment of the selection and storage stage of the present invention.

FIG. 2 illustrates an exemplary embodiment of the selection and storage stage of the present invention which corresponds to blocks 102 and 104 in FIG. 1. The following discussion is framed in the context of a cellular radiotelephone system using the Advanced Mobile Phone Service (AMPS) standard. The AMPS system uses ordinary FM modulation and frequency-division multiple access (FDMA). Those skilled in the art will recognize that the principals disclosed herein are applicable to other radio environments, such as trunked radio, television, radio, etc.

The AMPS standard for a cellular radiotelephone system uses 416, 30 kHz channel pairs allocated to a 25 MHz portion of the UHF band. If the 416 channel pairs were contiguous, then the bandwidth required by the channel pairs would only be 12.48 MHz. However, since the 416 available channel pairs are not contiguous, in order to access all of the available channels, the full 25 MHz portion of the UHF band must be processed.

In an exemplary embodiment of the present invention, the 25 MHz portion is first selected and then translated to baseband using a conventional complex demodulator so that the band of interest occupies the spectral region from 0 to 25 MHz, positive frequencies only. The translated 25 MHz portion is then passed through an analog-to-digital (A/D) converter 214 that, for example, produces complex samples having a sample rate of 30.72 MHz. A/D conversion is well-known in the art and is described, for example, in U.S. Pat. No. 4,831,382, the disclosure of which is hereby incorporated by reference.

The digitized signal is then provided as an input to a Fast Fourier Transform (FFT) module 216. Fast Fourier Transforms are well-known in the art and are described, for example, in U.S. Pat. No. 6,081,821, the disclosure of which is hereby incorporated by reference. One skilled in the art will recognize that the FFT module can be replaced with modules that implement other conventional algorithms which efficiently compute the Discrete Fourier Transform (DFT) of signal data or images, such as a prime factor algorithm (e.g., the Good algorithm) or the Winograd algorithm. The exemplary FFT module 216 produces a spectral estimate by forming a 1024 point FFT for each channel. The 1024 points correspond to a time record of 33.3 μs and a spectral resolution of 30 kHz, the bandwidth of the exemplary AMPS channel. The FFT module 216 produces 128 consecutive complex samples which, for example, takes 4.267 milliseconds at the aforementioned sample rates.

In an exemplary embodiment of the present invention, FFT 216 includes an 80 dB Dolph-Chebyshev weighting on the input data to prevent spectral leakage from producing an unacceptable level of cross-talk or adjacent channel interference. In this exemplary embodiment, the input signals are multiplied by the 80 dB Dolph-Chebyshev weighting function prior to transformation into the frequency domain by FFT 216. Dolph-Chebyshev weighting functions are well-known in the art and are described, for example, in U.S. Pat. No. 5,491,727, the disclosure of which is hereby incorporated by reference. When an 80 dB Dolph-Chebyshev weighting is used on signals input to FFT 216, greater than 60 dB of spectral leakage interference rejection is achieved in any channel situated more than three channels removed from any occupied channel. However, those of ordinary skill in the art will recognize that Dolph-Chebyshev weighting functions at different amplitude levels can be used. In addition, windowing functions other than Dolph-Chebyshev can also be used, such as Hamming, Taylor, and Gaussian.

The 128 consecutive complex samples taken from the FFT module 216 produce a 128-point frequency domain signal for each of the 416 channels. The frequency domain signals for each of the 416 channels are then stored in memory module 222. Memory module 222 can be comprised of, for example, commercially-available random access memory. However, those of ordinary skill in the art will recognize that other forms of memory can be used for memory module 222, such as commercially-available hard-disk drives. In addition, at the same time the 128 consecutive complex samples for each channel are stored in the memory module 222, the samples are also provided to a power calculation module 218. Power calculation module 218 converts the 128 consecutive complex samples for each channel into a power spectrum by, for example, computing the square magnitude for each channel and averaging the 128 consecutive power spectra to form a single power spectral estimate. The power spectral estimate for each channel is then provided to the select module 220.

The select module 220 compares the power spectral estimate for each channel with a threshold value to determine which channels are active, i.e., in use, and which are inactive. Once an active channel is found, the select module 220 informs memory module 222 of the existence of the active channel.

In an alternate exemplary embodiment of the present invention, the power calculation module 218 and the select module 220 can be replaced by other determination modules which use criteria other than power to select the active channels. For example, the active channels may already be known to the system and/or a data signal can be provided from an external source which identifies which channels are active.

After all of the active channels have been identified by select module 220, memory module 222 then provides the 128 consecutive complex samples for each active channel 224 to block 106 (see FIG. 1) which produces a contiguous frequency domain composite signal. In an exemplary embodiment of the present invention, the composite signal also includes mapping data produced by the memory module 222 that indicates the original frequency assignments for each of the active channels so that the original wide-band spectrum can be reproduced from the composite signal. Alternatively, the mapping data can be contained in a separate signal and can be produced, for example, by the power calculation module 218, the FFT 216, or the A/D converter 214.

Figure 3:
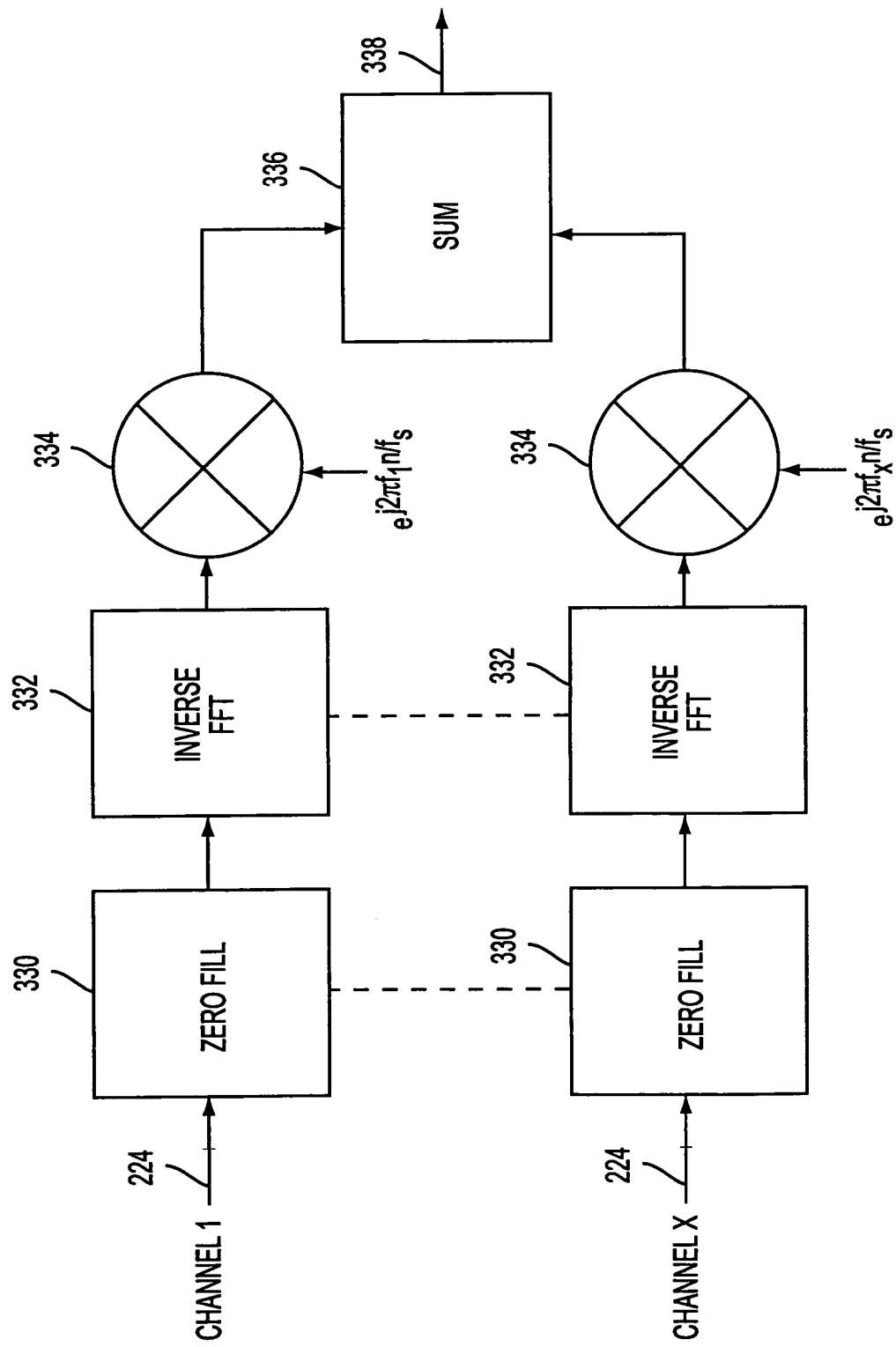
FIG. 3 illustrates an exemplary embodiment of blocks 106 and 108 of FIG. 1.

FIG. 3 further illustrates blocks 106 and 108 of FIG. 1. For simplification purposes only, it is assumed that up to 16 channels were selected by the select module 220 (see FIG. 2). However, those of ordinary skill in the art will recognize that any number of channels can be selected by select module 220. 16×30 kHz channels will require a total of 480 kHz, therefore the present invention reorganizes the 16 channels present in the 0–25 MHz band into a contiguous 0–480 kHz frequency band. The reorganization can be accomplished by zero-filling (i.e., padding with zeroes at the end of each of the signals) each of the selected 128-point frequency domain signals 328 from the memory module 222 using zero fill module 330 to create a 2048 point frequency domain signal. The 2048-point zero-padded frequency domain signals are then converted back into the time domain using inverse FFT (IFFT) module 332. Inverse FFTs are well-known in the art and are described, for example, in the above-incorporated U.S. Pat. No. 6,081,821. Zero fill module 330 and IFFT module 332 effectively resample each of the selected time domain signals from the 30 kHz sampling rate to a 480 kHz sampling rate. Following the effective resampling, each selected channel is translated to a unique and non-overlapping 30 kHz section of the 480 kHz band. The translation is effected by multiplying the resampled signals by the appropriate complex sinusoid 334:

$$y(n) = x(n)e^{j2\pi f_k \frac{n}{f_s}} \quad n = 0, 1, \ldots, 2047$$

where y(n) is the modulated signal, x(n) is the time domain signal, $f_k$ is the translation frequency, e.g., 0 kHz–450 kHz, and $f_s$ is the sampling rate, e.g., 480 kHz.

The modulated signals for each of the 16 channels are added together in sum module 336 which produces a contiguous 480 kHz band 338 of 16×30 kHz channels.

The contiguous band can then be transported to a remote location so that the channels can be extracted and remodulated using their original frequencies. Using this technique, for example, a cellular base station can be extended to cover a remote area by transporting the contiguous band and retransmitting the channels of the base station in the remote area without the need for building a new base station. Since the contiguous band has a significantly smaller bandwidth than the total possible bandwidth of a base station (e.g., 480 kHz vs. 25 MHz) the resources needed to transport the effective bandwidth are greatly reduced. The contiguous band can be transported using any known transmission medium such as, fiber, coax, microwave link, satellite link, etc.

Figure 4:
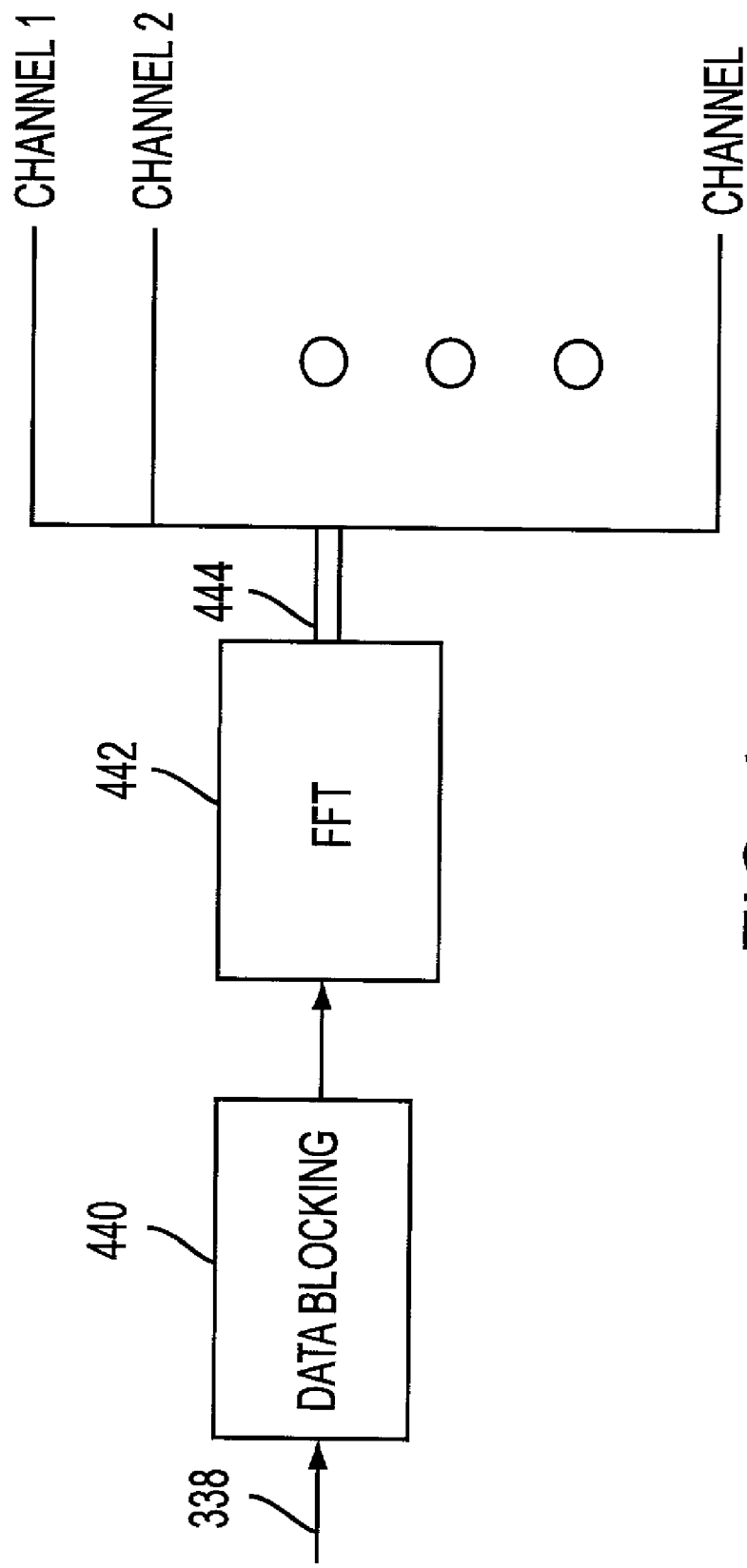
FIG. 4 illustrates an exemplary embodiment of the present invention which recovers individual channels from a contiguous band.

FIG. 4 illustrates an exemplary embodiment of the present invention which recovers the individual channels from the contiguous band. As stated above with reference to FIG. 3, the contiguous band is made up of 2048 complex samples representing 0–480 kHz having a sample rate of 480 kHz. Data blocking module 440 divides the 2048 complex values into 128 blocks of 16 samples each. Each 16-sample block is weighted with, for example, a 16-point 80 dB Dolph-Chebyshev weight and input to the FFT 442. The FFT 442 converts each 16-sample block into 16 channels 444, each channel 444 having bandwidth of 30 kHz. The successive 128 blocks are converted by the FFT 442 into 128 frequency domain samples in each channel 444. Each 30 kHz frequency domain channel 444 is then re-modulated to its original frequency using conventional digital-to-analog (D/A) conversion and frequency translation techniques so that a cellular radiotelephone user present in a remote location would be able to use a base station (or neighboring base station) without the need for additional equipment. D/A conversion is well-known in the art and is described, for example, in U.S. Pat. No. 6,140,953, the disclosure of which is hereby incorporated by reference. Frequency translation is also well-known in the art and is described, for example, in U.S. Pat. No. 4,316,282, the disclosure of which is hereby incorporated by reference.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. An adaptive information compression system comprising:
    means for evaluating segments of a radio frequency signal to determine which segments are active, each segment representing a specific channel at a specific frequency;
    means, responsive to said means for evaluating, for reformatting the active segments into a contiguous order in a signal with a lower bandwidth than said radio frequency signal.

2. The system of claim 1, wherein said means for evaluating comprises:
    means for calculating a power value for each of said segments of said radio frequency signal; and
    means for comparing the power of each of said segments of said radio frequency signal to a predetermined threshold value.

3. The system of claim 1, further comprising:
    means for recreating said radio frequency signal by modulating each of said active segments on their respective specific frequencies.

4. A method for adaptive information compression comprising the steps of:
    evaluating segments of a radio frequency signal to determine which segments are active, each segment representing a specific channel at a specific frequency; and
    based on said evaluating, reformatting the active segments into a contiguous order in a signal with a lower bandwidth than said radio frequency signal.

5. The method of claim 4, wherein said step of reformatting further comprises:
    calculating a power value for each of said segments of said radio frequency signal; and
    comparing the power of each of said segments of said radio frequency signal to a predetermined threshold value.

6. The method of claim 4, further comprising:
    recreating said radio frequency signal by modulating each of said active segments on their respective specific frequencies.

* * * * *